US006804948B2

United States Patent
Oishi

(10) Patent No.: US 6,804,948 B2
(45) Date of Patent: Oct. 19, 2004

(54) LOBE MIXER FOR JET ENGINE

(75) Inventor: Tsutomu Oishi, Misugidai Hannou (JP)

(73) Assignee: Ishikwawjima-Harima Heavy Industries, Co. Ltd., Tokyo (JP)

( * ) Notice: Subject to any disclaimer, the term of this patent is extended or adjusted under 35 U.S.C. 154(b) by 217 days.

(21) Appl. No.: 10/182,900

(22) PCT Filed: Apr. 15, 2002

(86) PCT No.: PCT/JP02/03716
§ 371 (c)(1),
(2), (4) Date: Aug. 2, 2002

(87) PCT Pub. No.: WO02/086303
PCT Pub. Date: Oct. 31, 2002

(65) Prior Publication Data
US 2004/0006968 A1 Jan. 15, 2004

(30) Foreign Application Priority Data
Apr. 19, 2001 (JP) .......... 2001-121590

(51) Int. Cl.[7] ............... F02C 1/46
(52) U.S. Cl. ........ 60/262; 181/220; 239/265.17

(58) Field of Search ............. 60/262; 181/213, 181/220; 239/265.17, 265.19

(56) References Cited

U.S. PATENT DOCUMENTS

| | | | | |
|---|---|---|---|---|
| 3,048,376 A | * | 8/1962 | Howald et al. | ............... 60/262 |
| 4,401,269 A | * | 8/1983 | Eiler | ............... 60/262 |
| 4,813,230 A | * | 3/1989 | Braithwaite | ............... 60/262 |
| 5,638,675 A | | 6/1997 | Zysman et al. | |
| 5,884,472 A | | 3/1999 | Presz, Jr. et al. | |

* cited by examiner

Primary Examiner—Louis J. Casaregola
(74) Attorney, Agent, or Firm—Griffin & Sziple, P.C.

(57) ABSTRACT

A lobe mixer (22) used in jet engines, is provided with diameter expansion portions (22a) in which the diameters gradually increase in the downstream direction, in which adjacent diameter expansion portions have different diameters from each other, and which guide the core gasses that flow along the inner sides of the adjacent diameter expansion portions, peripherally outwards at different angles. Thus, the gasses are mixed without the thrust of the jet engine being reduced, and the noise of the jet is reduced.

2 Claims, 6 Drawing Sheets

(a) Conventional type (base)    (b) Multi-lobe typr    (c) Scallop type

LOBE MIXER FOR JET ENGINE

BACKGROUND OF THE INVENTION

1. Technical Field of the Invention

The present invention relates to a lobe mixer for a jet engine used in aircraft.

2. Description of the Related Art

Noise produced by the engines of an airplane is one of the most troublesome of environmental problems, and there is a strong desire to reduce it. This jet noise is caused mainly by turbulent flow or the impulse waves produced by the speed difference between the engine exhaust and the surrounding air, and the interference between them.

As shown in FIG. 1, an airplane engine 1 (jet engine) is provided with a fan 2 to draw air in, a compressor 3 to compress the air taken in, a combustor 4 for burning fuel in the compressed air, a turbine 5 that drives the fan 2 and the compressor 3 using the combustion gasses from the combustor 4, and so on.

Basically, the volume of jet noise is proportional to the eighth power of the jet speed, so as the jet speed is increased, the resulting noise increases very rapidly. Thus a turbo-jet engine, the greatest component of the noise is the noise produced by the jet that produces the thrust, even a turbo-fan engine with a high bypass ratio, the noise of the jet is the next greatest after the noise produced by the fan.

When an airplane is flying, the total volume of noise decreases mainly because the difference between the speed of the exhaust (jet flow) and that of the surrounding air is decreased, however, the amount of reduction is not the same in each direction; the reduction is greatest in the direction of the exhaust, on the other hand, the amount of the reduction becomes smaller towards the front. To reduce jet noise, a number of methods had been proposed; a divided nozzle can be used although this sacrifices thrust (thrust force) to some extent, or a jet can be shielded using a fixed wall or high-temperature gas. The most effective idea is to reduce the speed of the jet flow.

FIG. 2 shows the relationship between the frequency and the amount of acoustic output (noise) according to different speed distributions in the jet flows ejected from the exhausts of turbo-fan engines with the same capacity of the displacement.

In case (a) the main jet is composed of a high-speed core flow mainly ejected from the center of the exhaust port and a low-speed bypass flow discharged principally from the surrounding portions of the exhaust port, constituting concentric component which produce an effective thrust.

As shown in the lower diagram in FIG. 2, the main jet (a) produces a large noise output particularly in the low-frequency range. On the other hand, the speed inverted jets shown in (c) and (d) produce large noise outputs in the medium and high frequency ranges, and a structure is required to invert the distribution of speeds in the jet flow. Consequently, the mixed jet shown in (b) is considered desirable because it can reduce the overall noise outputs.

Therefore, the technologies conventionally employed use a mixer (mixing device) installed in the exhaust nozzle that effectively mixes the core flow and the bypass flow, thereby reducing the jet speed of the core flow, and at the same time, increasing the speed of the bypass flow, so making the entire distribution of jet speeds ejected from the exhaust nozzle uniform, and reducing jet noise.

In practice, as shown in FIG. 1, air drawn in by the fan 2 is split into a core flow 14 that passes through the compressor 3, combustor 4 and turbine 5, and a bypass flow 13 (fan flow) that bypasses these devices, and by merging and mixing these flows using the mixer 15, the jet noise is reduced.

Mixers conventionally used are normally provided with lobes as shown in FIG. 3; this lobe mixer 15 is formed with an inner guide wall (partition wall) with a wave shape in cross section; the shape is such that the waves become larger downstream, and at the downstream end, the bypass flow 13 (solid arrow lines) and the core flow 14 (broken arrow lines) merge together, and in the turbulent region X downstream of the mixer 15 (see FIG. 1), both the bypass and core flows are mixed efficiently.

In the conventional lobe mixer 15 typically shown in FIG. 3, there is a problem that when the expansion angle (slope) of the lobe is made small to give a high mixing effect, the total length becomes long and the weight is large. Conversely with a large expansion angle, no satisfactory mixing effect can be obtained because the flows remain separated.

Under these circumstances, various mixers have been devised to improve conventional major lobe mixers (FIG. 4a); such as a multi-lobe-type lobe mixer (FIG. 4b) with an increased number of lobes and a scallop-type lobe mixer (FIG. 4c) with scallop-shaped cutaways in the lobe portion. These mixers was improved for reduce such a concentric effect around the mixing region, caused by same angles of slopes of these lobe mixer towards up side of jet stream having the same angle.

However, in the multi-lobe-type lobe mixer, there is a problem that the efficiency of the thrust is reduced because of the increased weight and frictional resistance. The scallop-type lobe mixer is free from this type of demerit, but particularly in the portion where there is a large pressure difference, the noise associated with variations of pressure in the scallop portion increases in the high-frequency range, so the overall noise level is large.

Although it is important to mix the bypass flow with the core flow to make the distribution of speeds in the jet flow uniform for the purpose of reducing noise, even the aforementioned improved lobe mixers cannot satisfactorily avoid lowering the thrust efficiency when they completely mix the flows. More explicitly, even with an improved lobe mixer, the bypass flow and the core flow cannot be mixed efficiently, so there are the problems that (1) the jet thrust is reduced by mixing losses, and (2) the speed of the jet flow near the center is still large, and noise still increases with jet speed.

SUMMARY OF THE INVENTION

The present invention aims at solving the problems described above. That is, an object of the present invention is to provide a lobe mixer that efficiently mixes the bypass flow, core flow, etc. while suppressing the thrust losses caused by mixing and can reduce the jet noise.

The present invention offers a lobe mixer (22) for jet engines that mixes the core flow (14) passing through the compressor (3), combustor (4) and turbine (5), and the bypass flow (13) bypassing these devices, wherein the above-mentioned lobe mixer incorporates a diameter expansion portion (22a) in which the downstream diameters gradually increase with different angles of slopes in the aforementioned diameter expansion portion.

According to the above-mentioned configuration of the present invention, the diameter expansion portion that guides the core flow peripherally outwards has a slope that diverges in the downstream direction of the engine shaft and adjacent diameter expansion portions are shaped with different angles of slopes in each portion, so the core flow is ejected in the direction of the slopes of these diameter expansion portions, peripherally outwards at different angles. That is, since the core gasses flowing in adjacent diameter expansion portions are ejected peripherally outwards at different angles according to the slopes, the gasses are widely diffused, so the core flows are efficiently dispersed and mixed with the surrounding bypass flows.

For this purpose, the angles of slopes of the diameter expansion portions that guide the core flows peripherally outwards can be either of two or more types.

In the lobe mixer (22) for jet engines that mixes the core flow (14) passing through the compressor (3), combustor (4) and turbine (5) and the bypass flow (13) bypassing these devices, the above-mentioned lobe mixer can also be composed of a lobe mixer for jet engines that incorporates diameter reduction portions (22b) in which the downstream diameters are gradually decreased, and the angles of slopes of the aforementioned adjacent reduction portions are different from each other.

In the aforementioned configuration of the present invention, because the outer surface of the diameter reduction portions that guide the bypass flows peripherally inwards have slopes which converge in the downstream direction of the engine shaft and the adjacent diameter reduction portions are formed with different angles of slopes from each other, the bypass flows are blown out at different angles peripherally inwards according to the slopes of these diameter reduction portions. In other words, bypass gasses flowing in adjacent diameter reduction portions are discharged peripherally inwards with different angles depending on the slopes, so the flows are dispersed over a wide range, so that the bypass gasses are dispersed and mixed efficiently with the core gasses flowing inside the bypass gasses.

In the above, the angles of slopes of the diameter reduction portions that guide the bypass gasses peripherally inwards may be of two or more types.

It is also preferable that the diameter expansion portions (22a) are sloped so as to expand in the downstream direction of the engine shaft, that adjacent diameter expansion portions are sloped differently angle from each other, that diameter reduction portions (22b) are arranged with their slopes converging in the downstream direction of the engine shaft, and that adjacent diameter reduction portions are provided with slopes that are different angles from each other.

Core gasses and bypass gasses can be completely mixed together by providing both diameter expansion and reduction portions with various types of slopes.

In the present invention, also offers a lobe mixer for jet engines, that mixes mixed gasses (26) comprising core gasses (14) passing thorough a compressor (3), a combustor (4) and a turbine (5), and bypass gasses (13) by passing the devices (3,4,5) with air drawn into an exhaust nozzle (12) from atmosphere, lobe mixer for jet engines thereof, with diameter expansion portions (27a) in which the diameters gradually increase in the downstream direction and with different slopes in the aforementioned adjacent diameter expansion portions between each other.

When the lobe mixer according to the present invention is used to draw atmospheric air into an exhaust nozzle and mix the air with the core and bypass gas flows, the distribution of the speeds of the jet flows ejected from the jet engine can be uniformed. Here, with the purpose of efficiently mixing and dispersing the air in the mixed gasses, the diameter expansion portions that guide the core gasses peripherally outwards are provided with slopes diverging in the downstream direction of the engine shaft, and adjacent diameter expansion portions have different angles of slopes from each other. The core gasses are blown peripherally outwards into the exhaust nozzle along with the slopes of these diameter expansion portions. Core gasses that flow in adjacent diameter expansion portions are blown out peripherally at different angles along with the slopes, so the gasses are diffused widely and are efficiently mixed and dispersed in the air introduced from outside and which flows around the outside of the core flow.

The slopes of the diameter expansion portions that guide the core flows peripherally outwards may be either of two or more types.

The present invention also provides, in the lobe mixer (27) for jet engines, in which the mixed flow (26) of the core flow (14) passing through the compressor (3), combustor (4) and turbine (5) and the bypass flow (13) bypassing these devices is mixed with atmospheric air drawn into the exhaust nozzle (12), a lobe mixer provided with diameter reduction portions (27b) in which the diameters gradually decrease in the downstream direction and the slopes are different in adjacent diameter reduction portions.

The lobe mixer according to the present invention makes the distribution of the speeds of the jet gasses blown out of a jet engine uniform by mixing air drawn into the exhaust nozzle with the above-mentioned mixed gasses, in the same way as with the aforementioned invention. In this case, to efficiently mix and disperse the air and mixed gasses, the diameter reduction portions that guide the air peripherally inwards are provided with slopes which converge in the downstream direction of the engine shaft, and adjacent diameter reduction portions are constructed with different angles of slopes from each other. The air is taken into the exhaust nozzle and is directed along the slopes of these diameter reduction portions, peripherally inwards. The air flowing in adjacent diameter reduction portions passes along these angles of slopes with different angles, peripherally inwards, therefore the air is widely diffused and efficiently mixed and dispersed in the core gasses flowing inside the air.

In this case, the slopes of the diameter reduction portions for guiding the bypass flows peripherally inwards may be of two or more kinds.

The diameter expansion portions (27a) have slopes that diverge in the downstream direction of the engine shaft, adjacent diameter expansion portions have different angles of slopes, the diameter reduction portions (22b) are provided with slopes that converge in the downstream direction of the engine shaft, and the adjacent diameter reduction portions have different slopes, according to a preferred embodiment.

The air drawn into the jet engine can be satisfactorily dispersed and mixed with the mixed gasses by providing various slopes in both the diameter expansion and reduction portions.

Other objectives and advantages of the present invention are revealed in the following paragraphs referring to the attached drawings.

DETAILED DESCRIPTION OF PREFERRED EMBODIMENTS

Figure 1:
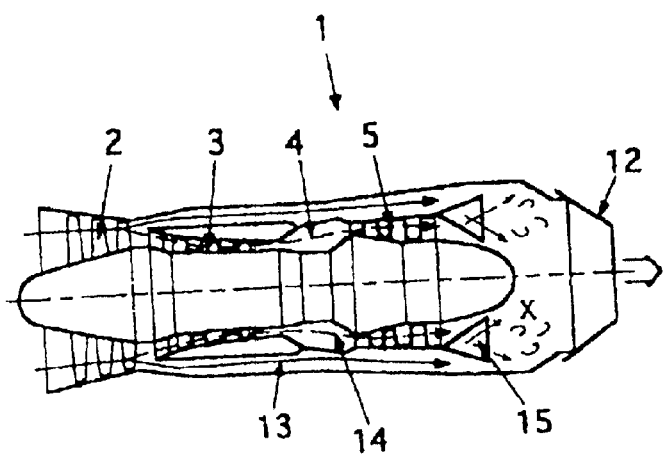
FIG. 1 is a drawing of a jet engine equipped with a conventional mixer.
Figure 2:
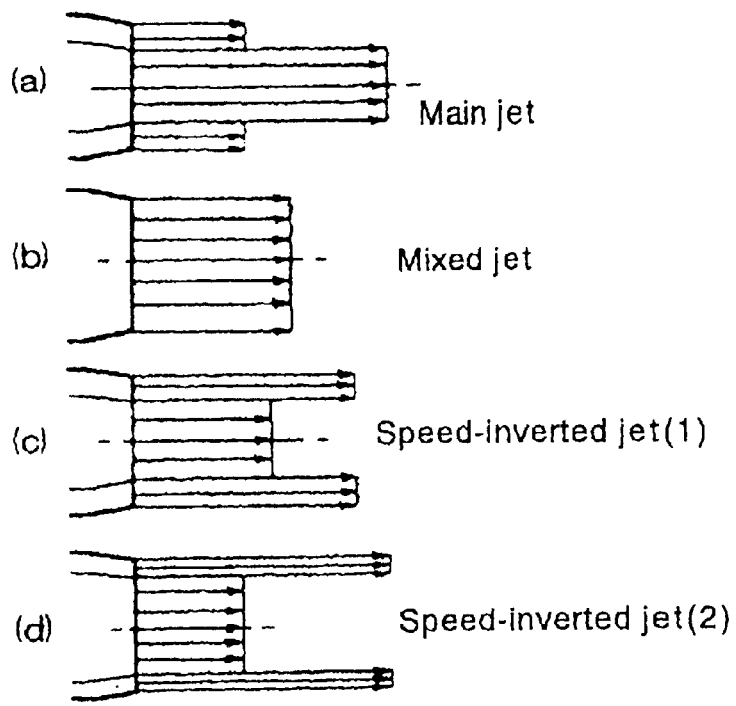
FIG. 2 shows the relationship between the distribution of speeds of jet exhaust flows and the acoustic output.
Figure 2:
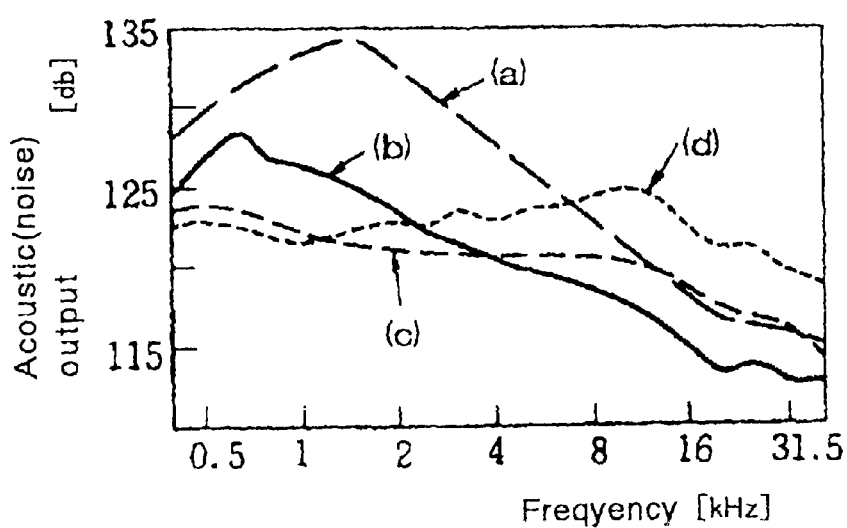
Figure 3:
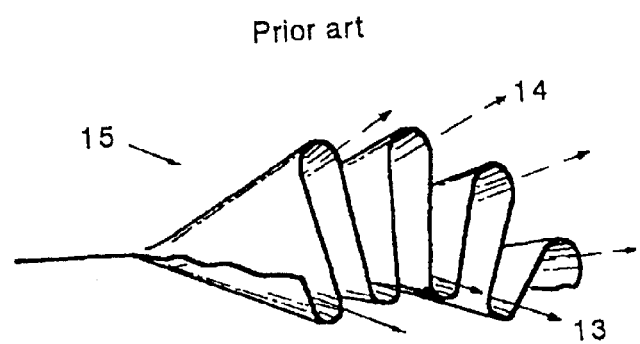
FIG. 3 is an isometric view of part of a conventional lobe mixer.
Figure 4:
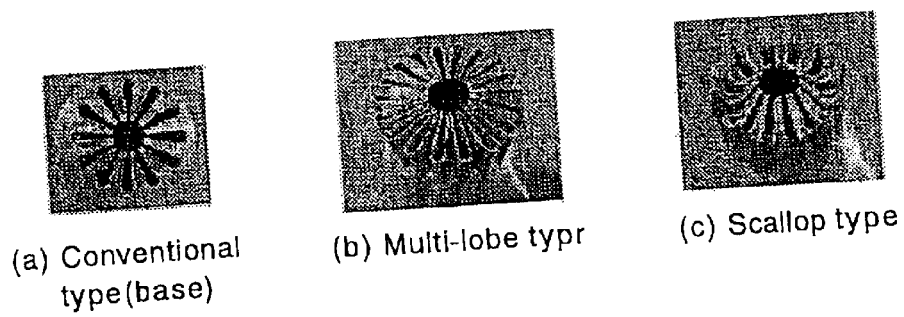
FIG. 4 shows improved types of lobe mixer; isometric views (a) for a multi-lobe type, and (b) for a scallop-type lobe mixer.

Preferred embodiments of the present invention are described below referring to the drawings. Throughout the drawings, the same portions are identified using the same numbers.

Figure 5:
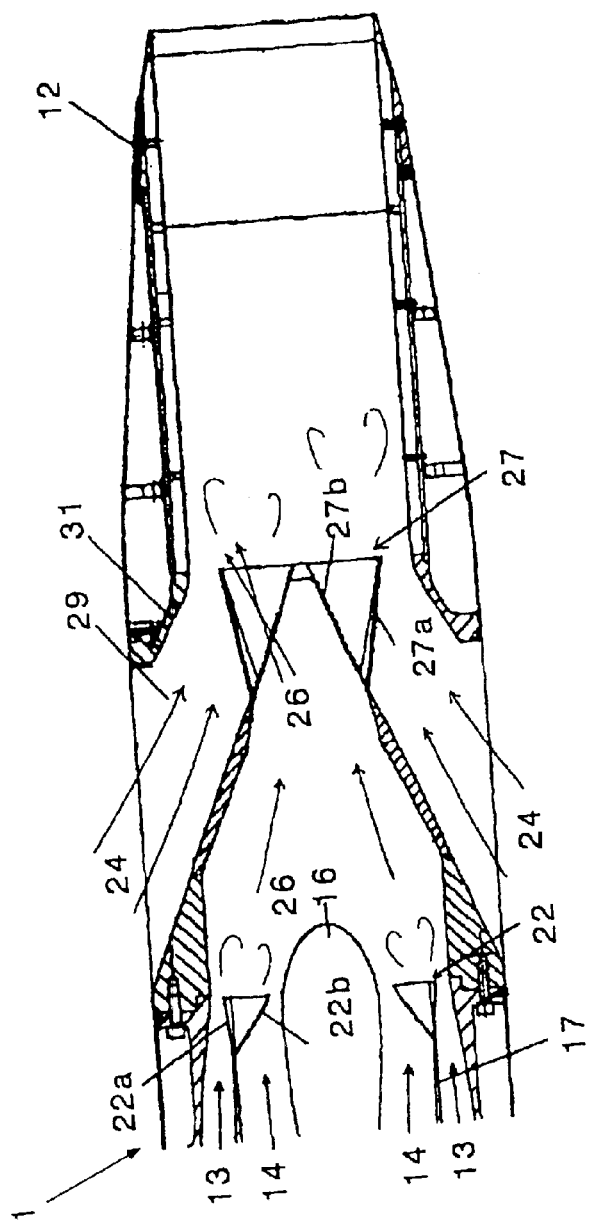
FIG. 5 is a sectional drawing of part of a jet engine provided with the lobe mixer for jet engines according to the present invention.

FIG. 5 is a sectional view of part of a jet engine equipped with the lobe mixer that is an embodiment of the present invention. In this jet engine, like the jet engine shown in FIG. 1, core gasses 14 pass through the compressor 3 (not illustrated), the combustor 4 (not illustrated) and the turbine 5 (not illustrated) and bypass gasses 13 bypass the aforementioned devices 3, 4 and 5, and the core gasses 14 are partitioned from the bypass gasses 13 by a cylindrical partition wall 17. In FIG. 5, item 16 indicates the tail cone.

Figure 6:
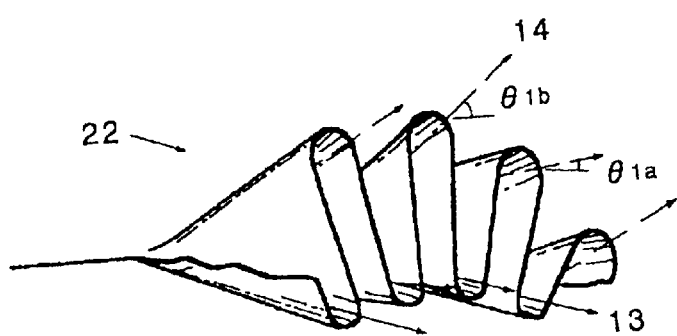
FIG. 6 shows an isometric view of part of the lobe mixer for jet engines according to the present invention.

The lobe mixer 22 of this embodiment shown in FIG. 6 (to be called the "first lobe mixer" for short) is used in a jet engine to mix the core gasses 14 that pass through the compressor 3, combustor 4 and turbine 5 with the bypass gasses 13 that bypass these devices 3, 4 and 5. The lobe mixer 22 is disposed at the end of the cylindrical partition wall 17 in the downstream direction, and is formed with diameter expansion portions 22a of which diameters gradually increase in the downstream direction and diameter reduction portions 22b of which the diameters gradually decrease in the downstream direction, which are arranged alternately in the circumferential direction at the location where the core gasses 14 mix with the bypass gasses 13.

The diameter expansion portions 22a are formed with slopes that diverge from the axis in the downstream direction of the engine shaft as shown in FIG. 6, and the angles of slopes of adjacent diameter reduction portions 22a are different from each other, thereby the core gasses 14 that flow inside adjacent diameter expansion portions are guided peripherally outwards at different angles ($\theta_{1a, 1b}$).

According to the aforementioned configuration, the first lobe mixer 22 installed in an engine efficiently mixes the bypass gasses 13 and the core gasses 14. In detail, since the diameter expansion portions 22a that guide the core gasses 14 peripherally on the outside have slopes that diverge in the downstream direction of the engine shaft and adjacent diameter expansion portions are provided with different angles of slopes, core gasses 14 are ejected in the direction of the slopes of these diameter expansion portions, peripherally outwards with different angles ($\theta_{1a, 1b}$). In other words, because the core gasses are guided peripherally outwards with different angles $\theta_{1a}$ and $\theta_{1b}$, the gasses are dispersed widely downstream of the first lobe mixer 22, so the gasses are mixed efficiently with the bypass gasses 13 that flow outside the core gasses 14.

Figure 7:
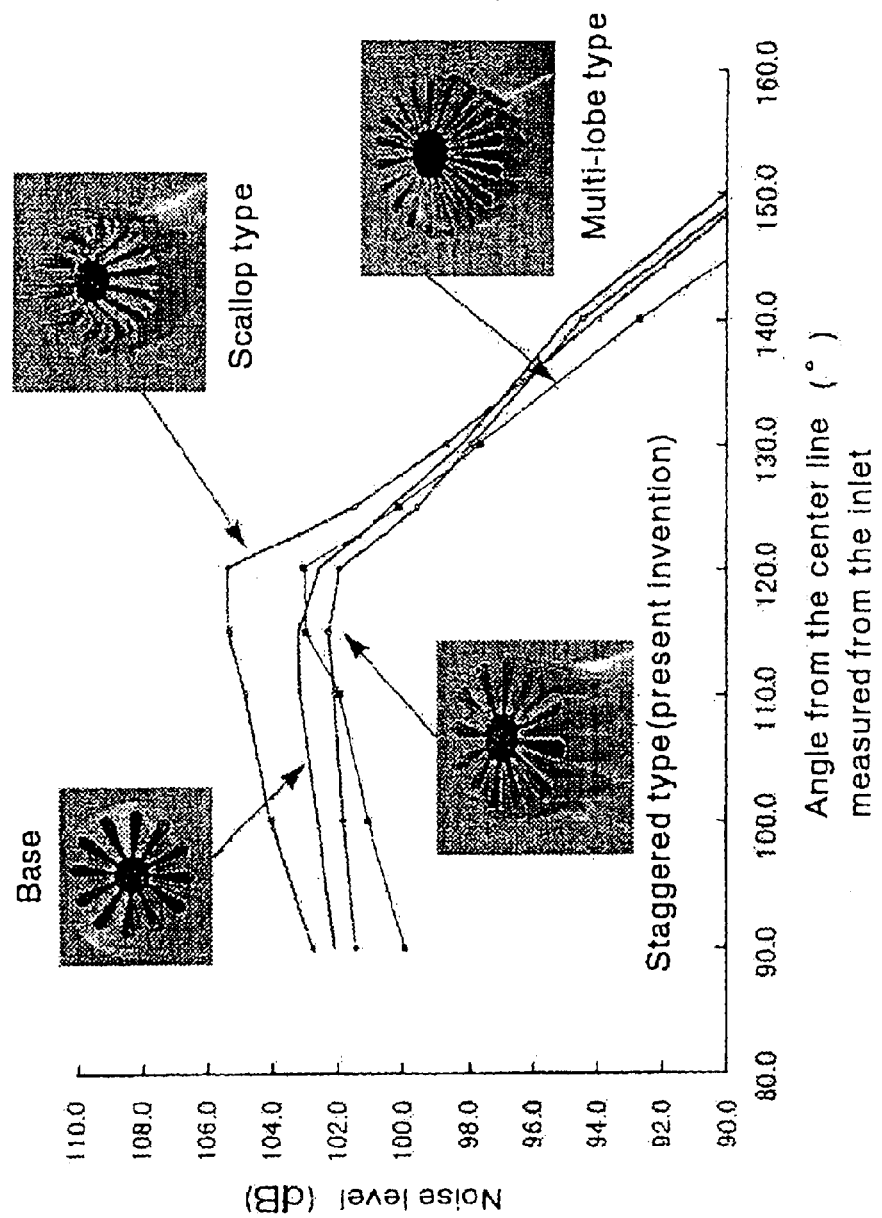
FIG. 7 is a diagram showing the relationship between measured noise levels of each type of lobe mixer and the angle from the center line measured from the inlet.

FIG. 7 shows the measured noise levels (dB) of conventional, multi-lobe type, scallop type and the above-mentioned configuration of the first lobe mixer according to the present invention (staggered type) at various angles from the inlet shaft (in the downstream direction of the center line of the jet engine). Here, the slope angles $\theta_{1a}$ and $\theta_{1b}$ are set at 4° and 10°, respectively.

To reduce the level of the noise heard by people, the maximum noise level should be suppressed to a low value. Obviously from the above-mentioned measurement results, the first lobe mixer (staggered type) according to the present invention has the lowest noise level at near 120° where noise levels become a maximum, compared to the other lobe mixers. Such a reduction of jet noise as described above might result from the fact that the core and bypass gasses are efficiently mixed, the speeds of the core gasses are decreased, the speeds of the bypass gasses are increased at the same time, and the entire distribution of gas speeds is made uniform.

The slope angles of adjacent diameter expansion portions 22a are not limited only to two types ($\theta_{1a, 1b}$), but each angle can differ individually.

In place of the diameter expansion portions of the first lobe mixer according to the present embodiment, diameter reduction portions 22b can also be provided; the portions 22b are formed so that the corrugations converge in the downstream direction of the engine shaft, and adjacent diameter reduction portions 22b have different slopes, thereby the bypass gasses 13 are guided peripherally inwards at different angles; or both diameter expansion portions 22a and diameter reduction portions 22b can be provided and both can be sloped.

Furthermore, the jet engine 1 in this embodiment of the present invention is, as shown in FIG. 5, provided with an inlet passage 29 that is open to the outer surface of the jet engine and draws air 24 into the exhaust nozzle 12, and an ejector 32 formed by the space between the inner wall 31 of the exhaust nozzle and the lobe mixer (called the "second lobe mixer" for short) 27.

The inlet passage 29 communicating from the outer surface of the jet engine 1 to the inside of the exhaust nozzle is disposed at an inclined angle to the surface of the engine as shown in FIG. 5, and the space between the inlet passage 29 and the inside of the exhaust nozzle 12 is made narrower by the inner wall 31 of the exhaust nozzle and the diameter expansion portion 27a of the second lobe mixer 27. At this location, high-pressure, high-speed mixed gasses 26 are discharged from the interior of the second lobe mixer 27, so these mixed gasses 26 produce an ejector effect, and air 24 is drawn in through the inlet passage 29 that communicates with the outside of the jet engine. A large amount of air 24 is drawn in by the ejector effect, and the air is mixed efficiently with the mixed gasses depending on the slope angles provided in the second lobe mixer 27 to be described later, thus the jet speed of the mixed gasses 26 is reduced and the velocity of the air flow is increased, so the distribution of speeds of the gas jets discharged from the exhaust nozzle is made even overall.

The second lobe mixer 27 is provided, in the same way as the aforementioned first lobe mixer 22, with a diameter expansion portions 27a in which the diameters gradually increase in the downstream direction, where the gas mixture 26 of the core gasses 14 and the bypass gasses 13 is mixed with the induced air 24; the slopes of adjacent diameter expansion portions 27a are different from each other, thus the mixed gasses 26 that flow along the inner peripheries of adjacent diameter expansion portions 27a are guided peripherally outwards with different angles ($\theta_{3a, 3b}$), and the mixing of the mixed gasses 26 and the induced air 24 is accelerated. That is, the mixed gasses 26 flowing in circumferentially adjacent diameter expansion portions 27a are blown out at different angles ($\theta_{3a, 3b}$) according to the slopes, so are widely dispersed and efficiently mixed with the air 24 drawn in and passing on the outside of the mixed gasses.

The construction of the second lobe mixer is substantially identical to that of the first lobe mixer shown in FIG. 6, therefore no drawing is given.

In the above description, the slopes of adjacent diameter expansion portions 27a are not limited only to two types ($\theta_{3a, 3b}$), but can be individually set at different angles.

In addition, the second lobe mixer of this embodiment can incorporate diameter reduction portions 27b in which the diameters gradually decrease in the downstream direction, while adjacent diameter reduction portions have different angles of slopes.

The first and second lobe mixers according to this embodiment of the present invention can be used independently from each other, however, when the mixers are used together, a higher dispersion and mixing efficiency can be expected, and by making the distribution of speeds of the jet gasses discharged from the exhaust nozzle uniform overall, the noise of the jet can be reduced satisfactorily.

The cross sectional shape (passage shape) of the above-mentioned diameter expansion portions (22a, 27a) and diameter reduction portions (22b, 27b) is not limited only to the wave form shown in FIG. 6, but the shape can also be a rectangle, triangle, trapezoid, etc.

As described above, the lobe mixer according to the present invention can improve mixing of the bypass gasses and core gasses (and air introduced from outside) while avoiding an increase in weight or a reduction in the thrust, compared to conventional lobe mixers, thereby the distribution of speeds of the jet gasses discharged from the exhaust nozzle can be made uniform and the jet noise can be reduced.

Although the present invention has been described referring to several preferred embodiments, it should be understood that the scope of rights covered by the present invention is not restricted only to these embodiments. Conversely, the scope of rights of the present invention should include all improvements, corrections and equivalent entities belonging to the scope of the attached claims.

What is claimed is:

1. A lobe mixer for jet engines, that mixes core gasses passing through a compressor, a combustor and a turbine and bypass gasses bypassing the compressor, the combustor, and the turbine, the lobe mixer comprising diameter expansion portions in which the diameters gradually increase in the downstream direction and the diameter expansion portions have different angles of slope in adjacent diameter expansion between each other.

2. A lobe mixer for jet engines, that mixes mixed gasses comprising core gasses passing through a compressor, a combustor and a turbine, and bypass gasses bypassing the compressor, the combustor, and the turbine, with air drawn into an exhaust nozzle from atmosphere, the lobe mixer comprising diameter expansion portions in which the diameters gradually increase in the downstream direction and the diameter expansion portions have different angles of slope in adjacent diameter expansion between each other.

* * * * *